(12) United States Patent
Onoda

(10) Patent No.: US 7,904,027 B2
(45) Date of Patent: Mar. 8, 2011

(54) BRANCHING FILTER AND MULTIPLEX TRANSCEIVER

(75) Inventor: Takanori Onoda, Minato-ku (JP)

(73) Assignee: NEC Corporation, Tokyo (JP)

( * ) Notice: Subject to any disclaimer, the term of this patent is extended or adjusted under 35 U.S.C. 154(b) by 685 days.

(21) Appl. No.: 11/410,027

(22) Filed: Apr. 25, 2006

(65) Prior Publication Data

US 2006/0246850 A1  Nov. 2, 2006

(30) Foreign Application Priority Data

Apr. 27, 2005 (JP) ................................. 2005-129651

(51) Int. Cl.
*H04B 1/38* (2006.01)

(52) U.S. Cl. ................. 455/73; 455/78; 455/82; 455/83; 455/306

(58) Field of Classification Search .................... 455/73, 455/78, 82, 83, 306, 39, 88, 556.1, 91, 307, 455/339
See application file for complete search history.

(56) References Cited

U.S. PATENT DOCUMENTS

| | | | |
|---|---|---|---|
| 5,854,986 A * | 12/1998 | Dorren et al. ............. | 455/562.1 |
| 6,185,201 B1 * | 2/2001 | Kiyanagi et al. ............ | 370/343 |
| 6,272,329 B1 * | 8/2001 | Sawchuk ...................... | 455/326 |
| 7,142,832 B2 * | 11/2006 | Inoue et al. .................. | 455/129 |
| 2001/0036842 A1 * | 11/2001 | Jantti ............................ | 455/561 |
| 2002/0039885 A1 * | 4/2002 | Weissman et al. ............. | 455/20 |
| 2004/0192392 A1 * | 9/2004 | Hoppenstein et al. ...... | 455/562.1 |
| 2005/0143023 A1 * | 6/2005 | Shih ............................. | 455/101 |

FOREIGN PATENT DOCUMENTS

| | | |
|---|---|---|
| JP | 59-185408 A | 10/1984 |
| JP | 63-9304 A | 1/1988 |
| JP | 1-189234 A | 7/1989 |
| JP | 1-194720 A | 8/1989 |
| JP | 8-46545 A | 2/1996 |
| JP | 2000-151214 A | 5/2000 |
| JP | 3178434 B2 | 4/2001 |
| JP | 2003-179520 A | 6/2003 |
| JP | 2004-207979 A | 7/2004 |

* cited by examiner

*Primary Examiner* — Tuan A Pham
(74) *Attorney, Agent, or Firm* — Sughrue Mion, PLLC

(57) ABSTRACT

Disclosed herein are branching filter suitable for connection with a transmission/reception integrated radio device, and a multiplex transceiver which utilizes the branching filter. A band pass filter unit separates an outgoing wave from an incoming wave. An antenna duplexer transmits an outgoing wave from the band pass filter unit to an antenna, and transmits an incoming wave from the antenna to the band pass filter unit. The band pass filter unit has two ports on the antenna side, and one port on the radio device side. A transmission/reception integrated radio device is connected to the port of the branching filter on the radio device side.

19 Claims, 4 Drawing Sheets

BRANCHING FILTER AND MULTIPLEX TRANSCEIVER

BACKGROUND OF THE INVENTION

1. Field of the Invention

The present invention relates to a branching filter for using a single antenna with a plurality of spectra, and a multiplex transceiver which utilizes the branching filter.

2. Description of the Related Art

Conventionally, a microwave branching filter device has been developed, as shown in JP-B-3178434. This microwave branching filter device comprises an antenna for transmitting and receiving signals, reflecting means for reflecting an applied signal, a plurality of transmission/reception duplexers, and the same number of circulators as the plurality of transmission/reception duplexers. Then, each of the circulators is disposed between the antenna and reflecting means. In particular, two of the three terminals of the circulator are connected in series such that they are connected to different terminals from each other, to allow an incoming signal from the antenna to flow to the reflecting means. Each of the plurality of transmission/reception duplexers has its duplexer terminal connected to the remaining terminal other than the aforementioned particular two terminals of each circulator, a transmission terminal connected to a transmission filter, and a reception terminal connected to a reception filter.

Apparent from the configuration described above, the transmission filter and reception filter, which are band pass filters, comprise one port on the antenna side with the terminal of the transmission filter connected to the terminal of the reception filter, and two ports on the radio device side with the terminal of the transmission filter not connected to the terminal of the reception filter.

Recently, radio devices used in microwave networks and the like rapidly decrease in size. This type of radio device is designed in a transmission/reception integrated configuration which has a transmitter and a receiver incorporated in a single housing to transmit an outgoing signal from the transmitter to an antenna and receive an incoming signal from the antenna to the receiver through a single port. Then, for making communications through the transmission/reception integrated radio device, single transmission/reception integrated radio device 1 is combined with single antenna 2, and they are connected through single port P, as illustrated in FIG. 1.

In communications using a microwave network, signals from a plurality of radio devices are often multiplexed for transmission and reception. While transmission/reception integrated radio device 1 is configured to transmit an outgoing signal from the transmitter to the antenna and receive an incoming signal from the antenna to the receiver through one port, this radio device 1 may be connected to the microwave branching filter device shown in JP-B-3178434 for use therewith.

The microwave branching filter device disclosed in JP-B-3178434 employs band pass filters for the transmission filter and reception filter, wherein the terminal of the transmission filter is connected to the terminal of the reception filter to provide one port on the antenna side, while the terminal of the transmission filter is not connected to the terminal of the reception filter to provide two ports.

Therefore, for connecting a transmission/reception integrated radio device to the microwave branching filter device disclosed in JP-B-3178434, an additional branching filter must be installed for separating an outgoing wave from a incoming wave between the two ports on the radio device side of the microwave branching filter device, i.e., the ports of the transmission filter and reception filter, and the one port of the transmission/reception integrated radio device.

SUMMARY OF THE INVENTION

It is an object of the present invention to provide a branching filter which is suitable for connection with a transmission/reception integrated radio device, and a multiplex transceiver which utilizes the branching filter.

To achieve the above object, a branching filter according to the present invention have a band pass filter and an antenna duplexer. The band pass filter has two ports associated on an antenna side, and one port on a radio device side. The band pass filter separates an outgoing wave and a incoming wave. The antenna duplexer transmits an outgoing wave from the band pass filter to the antenna. Also, the antenna duplexer transmits a incoming wave from the antenna to the band pass filter.

These objects, features, and advantages of the present invention will become apparent from the following description with references to the accompanying drawings which illustrate examples of the present invention.

DETAILED DESCRIPTION OF THE PREFERRED EMBODIMENTS

Figure 1:
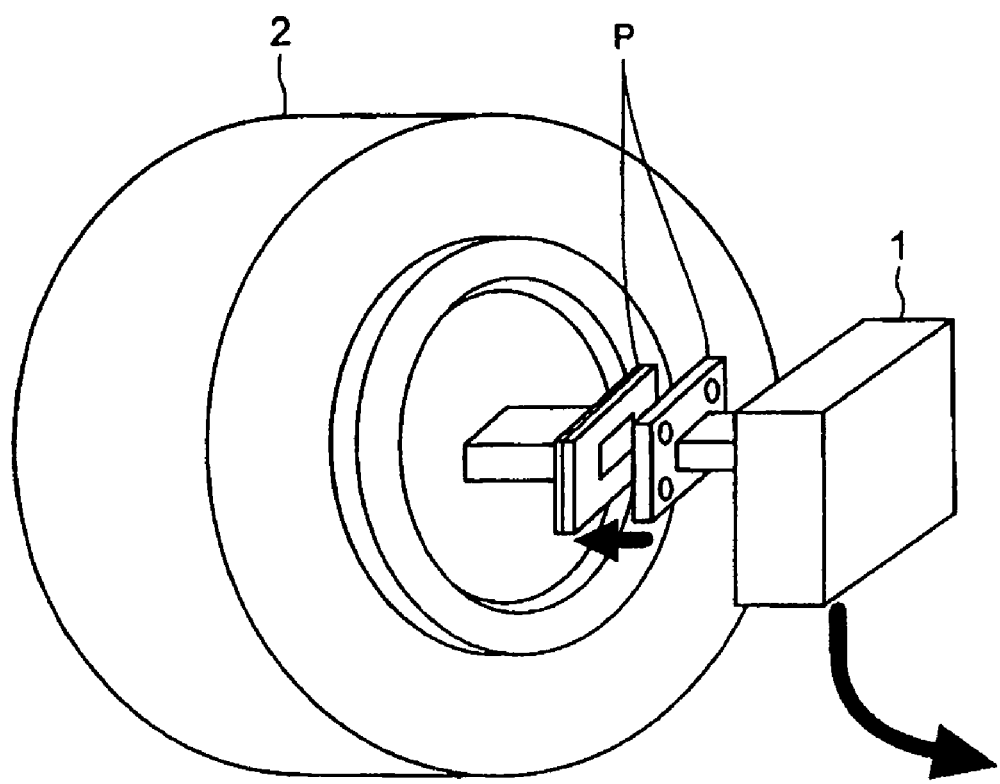
FIG. 1 is a perspective view illustrating an example of related art.
Figure 2:
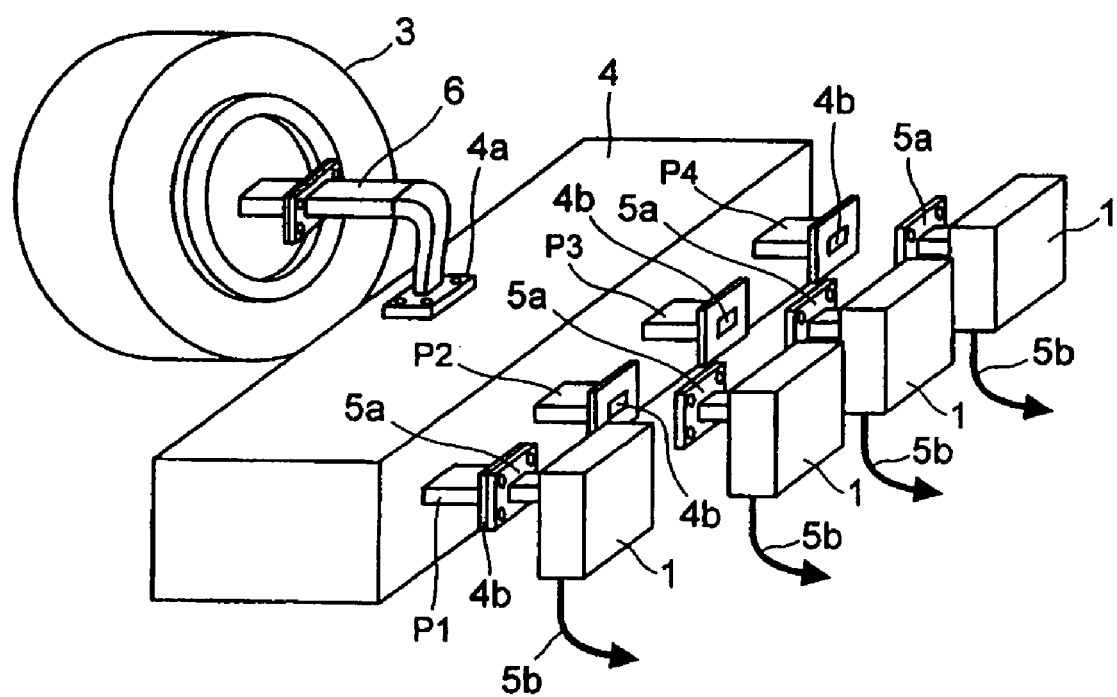
FIG. 2 is a perspective view illustrating one embodiment of the present invention.

As illustrated in FIG. 2, a multiplex transceiver according to one embodiment of the present invention comprises single antenna 3, branching filter 4 including single antenna port 4a connected to antenna 3 and a plurality of transmission/reception ports 4b, and a plurality of transmission/reception integrated radio devices 1. While the embodiment illustrated in FIG. 2 combines branching filter 4 with transmission/reception integrated radio devices 1 to build up a multiplex transceiver, branching filter 4 according to this embodiment of the present invention may be combined with radio devices which are not of a transmission/reception integrated type.

Figure 3:
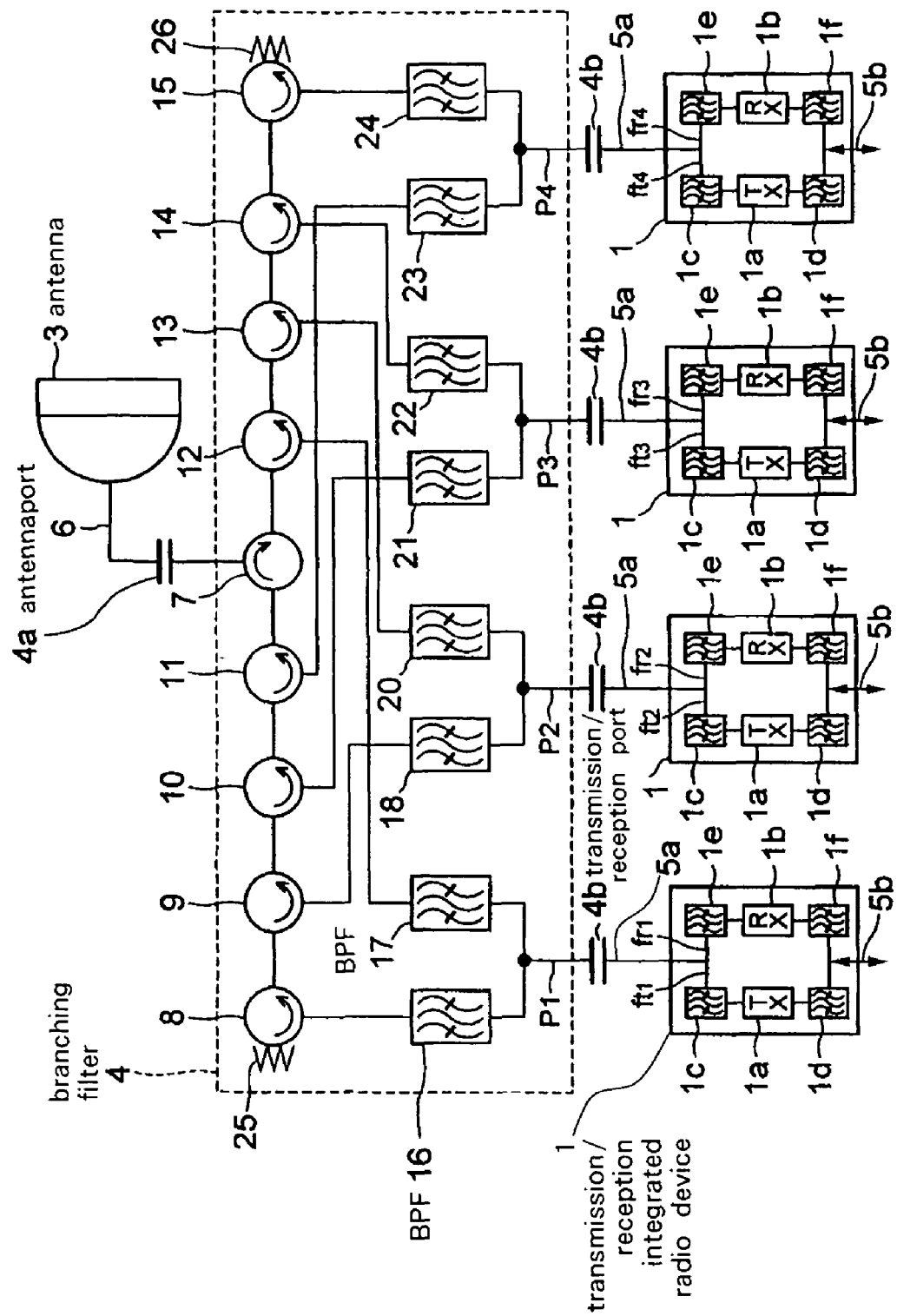
FIG. 3 is a circuit diagram illustrating one embodiment of the present invention.

As illustrated in FIG. 3, transmission/reception integrated radio device 1 comprises transmitter 1a, receiver 1b, shared waveguide 5a and shared coaxial line 5b commonly used by transmitter 1a and receiver 1b, and band pass filters (hereinafter called "BPF") 1c, 1d, 1e, 1f.

Transmitter 1a has an output connected to shared waveguide 5a through BPF 1c, and an input connected to shared coaxial line 5b through BPF 1d. Likewise, receiver 1b has an output connected to shared waveguide 5a through BPF 1e, and an input connected to shared coaxial line 5b through BPF 1f.

Band pass filters 1c, 1d make up a transmission filter which passes therethrough only a particular transmission frequency. Band pass filters 1e, 1f in turn comprise a reception filter which passes through only a particular reception frequency. Furthermore, band pass filters 1c, 1d, 1e, 1f one set each such that outgoing waves and incoming waves are separated in bands which are specified on a channel-by-channel basis.

Branching filter 4 is connected to antenna 3 through waveguide 6. Branching filter 4 also has four channels CH1-CH4, where transmission frequencies ft1-ft4 are allocated to outgoing waves on CH1-CH4, while reception frequencies fr1-fr4 are allocated to incoming waves on CH1-CH4, respectively. A plurality of transmission/reception integrated radio devices 1 are connected to branching filter 4. They include transmission/reception integrated radio device 1 which is allocated transmission frequency ft1 for outgoing waves and reception frequency fr1 for incoming waves; transmission/reception integrated radio device 1 which is allocated transmission frequency ft2 for outgoing waves and reception frequency fr2 for incoming waves; transmission/reception integrated radio device 1 which is allocated transmission frequency ft3 for outgoing waves and reception frequency fr3 for incoming waves; and transmission/reception integrated radio device 1 which is allocated transmission frequency ft4 for outgoing waves and reception frequency fr4 for incoming waves.

Branching filter 4 comprises band pass filters (hereinafter called "BPF") 16-24 and an antenna duplexer, and is configured to multiplex and demultiplex microwave radio signals.

The antenna duplexer comprises a transmission/reception duplexer 7, and circulators 8-11 and circulators 12-15 which are arranged symmetrically about transmission/reception duplexer 7. More specifically, circulators 8-11 correspond to outgoing waves on CH1-CH4, while circulators 12-15 correspond to incoming waves on CH1-CH4, respectively.

BPF 16 permits outgoing waves (at transmission frequency ft1) on channel CH1 to pass therethrough; BPF 18 permits outgoing waves (at transmission frequency ft2) on channel CH2 to pass therethrough; BPF 21 permits outgoing waves (at transmission frequency ft3) on channel CH3 to pass therethrough; and BPF 23 permits outgoing waves (at transmission frequency ft4) on channel CH4 to pass therethrough. On the other hand, BPF 17 permits incoming waves (at reception frequency fr1) on channel CH1 to pass therethrough; BPF 20 permits incoming waves (at reception frequency fr2) on channel CH2 to pass therethrough; BPF 22 permits incoming waves (at reception frequency fr3) to pass therethrough; and BPF 24 permits incoming waves (at reception frequency fr4) to pass therethrough.

Circulator 8 is connected to terminator 25 and to BPF 16 and circulator 9 associated with channel CH1. Circulator 8 rotates in a direction which is set such that outgoing waves propagate from terminator 25 to BPF 16 and from BPF 16 to circulator 9. Circulator 9 is connected to BPF 18 and circulator 10 associated with channel CH2. Circulator 9 rotates in a direction which is set such that outgoing waves propagate from circulator 8 to BPF 18, and from BPF 18 to circulator 10. Circulator 10 is connected to BPF 21 and circulator 11 associated with channel CH3. Circulator 10 rotates in a direction which is set such that outgoing waves propagate from circulator 9 to BPF 21, and from BPF 21 to circulator 11. Circulator 11 is connected to BPF 23 and transmission/reception duplexer (circulator) 7 associated with channel CH4. Circulator 11 rotates in a direction which is set such that outgoing waves propagate from circulator 10 to BPF 23, and from BPF 23 to circulator 7.

Circulator 7, which functions as transmission/reception duplexer 7, rotates in a direction which is set such that outgoing waves from BPF 23 propagate to antenna 23 and is also set such that incoming waves from antenna 3 propagate to circulator 12.

Circulator 12 is connected to transmission/reception duplexer 7 and to BPF 17 and circulator 13 associated with channel CH1. Circulator 12 rotates in a direction which is set such that incoming waves propagate from transmission/reception duplexer 7 to BPF 17, and from BPF 17 to circulator 13. Circulator 13 is connected to BPF 20 and circulator 14 associated with channel CH2. Circulator 13 rotates in a direction which is set such that incoming waves propagate from circulator 12 to BPF 20, and from BPF 20 to circulator 14. Circulator 14 is connected to BPF 22 and circulator 15 associated with channel CH3. Circulator 14 rotates in a direction which is set such that outgoing waves propagate from circulator 13 to BPF 22, and from BPF 22 to circulator 15. Circulator 15 is connected to BPF 24 associated with channel CH4 and terminator 26. Circulator 15 rotates in a direction which is set such that incoming waves propagate from circulator 14 to BPF 24, and from terminator 26 to BPF 24.

Further, transmission BPF 16 and reception BPF 17, which are combined into a set associated with channel CH1, have terminals on the radio device side, connected in common to form one port, on the opposite side to those terminals connected to circulator 8 and circulator 12, and have two terminals on the antenna side, which are not connected and therefore form two ports. Transmission BPF 18 and reception BPF 20, which are combined into a set associated with channel CH2, have terminals on the radio device side, connected in common to form one port, on the opposite side to those terminals connected to circulator 9 and circulator 13, and have two terminals on the antenna side, which are not connected and therefore form two ports. Transmission BPF 21 and reception BPF 22, which are combined into a set associated with channel CH3, have terminals on the radio device side, connected in common to form one port, on the opposite side to those terminals connected to circulator 12 and circulator 13, and have two terminals on the antenna side, which are not connected and therefore form two ports. Transmission BPF 23 and reception BPF 24, which are combined into a set associated with channel CH4, have terminals on the radio device side, connected in common to form one port, on the opposite side to those terminals connected to circulator 11 and circulator 15, and have two terminals on the antenna side, which are not connected and therefore form two ports.

Further, the commonly connected ports of transmission BPF 16 and reception BPF 17 which are combined into a set; the commonly connected ports of transmission BPF 18 and reception BPF 20 which are combined into a set; the commonly connected ports of transmission BPF 21 and reception BPF 22 which are combined into a set; and the commonly connected ports of transmission BPF 23 and reception BPF 24 which are combined into a set are each connected to waveguide 5a of transmission/reception integrated radio device 1 associated therewith.

Next, a description will be given of the operation during transmission. Transmission/reception integrated radio device 1 on channel CH1 combined with branching filter 4 configured as described above is applied with an outgoing signal from coaxial line 5b. The outgoing signal is then supplied to transmitter 1a through BPF 1d. Transmitter 1a transmits an outgoing wave at transmission frequency ft1, based on the signal, through BPF 1c from waveguide 5a to branching filter 4.

The outgoing wave at transmission frequency ft1 on CH1 transmitted from transmission/reception integrated radio device 1 associated with channel CH1 propagates through transmission BPF 16 to circulator 8. The circulator 8 rotates in a direction such that the outgoing wave propagates from transmission BPF 16 to circulator 9. Circulator 9 propagates the outgoing wave on CH1 toward transmission BPF 18. However, transmission frequency ft1 is within the rejection band of transmission BPF 18. Therefore, the outgoing wave on CH1 is reflected by transmission BPF 18, and is propagated toward circulator 10 by circulator 9. However, since transmission frequency ft1 is within the rejection band of each transmission BPF 21, 23, the outgoing wave is reflected by transmission BPF's 21, 23. The outgoing wave on CH1, which has thus reached circulator 7, eventually propagates through circulator 7 toward antenna 6.

Transmission/reception integrated radio device 1 associated with channel CH2 is applied with an outgoing signal from coaxial line 5b. The outgoing signal is then supplied to transmitter 1a through BPF 1d. Transmitter 1a transmits an outgoing wave at transmission frequency ft2, based on the signal, through BPF 1c from waveguide 5a to branching filter 4.

The outgoing wave at transmission frequency ft2 on CH2 transmitted from transmission/reception integrated radio device 1 associated with channel CH2 propagates through transmission BPF 18 to circulator 9. The circulator 9 rotates in a direction such that the outgoing wave propagates from transmission BPF 18 to circulator 10. Circulator 10 propagates the outgoing wave on CH2 toward transmission BPF 21. However, transmission frequency ft2 is within a rejection band of transmission BPF 21. Therefore, the outgoing wave on CH2 is reflected by transmission BPF 21, and is propagated toward circulator 11 by circulator 10. However, since transmission frequency ft2 is within the rejection band of each transmission BPF 21, 23, the outgoing wave is reflected by transmission BPF's 21, 23. The outgoing wave on CH2, which has thus reached circulator 7, eventually propagates through circulator 7 toward antenna 6.

Transmission/reception integrated radio device 1 associated with channel CH3 is applied with an outgoing signal from coaxial line 5b. The outgoing signal is then supplied to transmitter 1a through BPF 1d. Transmitter 1a transmits an outgoing wave at transmission frequency ft3, based on the signal, through BPF 1c from waveguide 5a to branching filter 4.

The outgoing wave at transmission frequency ft3 on CH3 transmitted from transmission/reception integrated radio device 1 associated with channel CH3 propagates through transmission BPF 21 to circulator 10. The circulator 10 rotates in a direction such that the outgoing wave propagates from transmission BPF 21 to circulator 11. Circulator 11 propagates the outgoing wave on CH3 toward transmission BPF 23. However, transmission frequency ft3 is within the rejection band of transmission BPF 23. Therefore, the outgoing wave on CH3 is reflected by transmission BPF 23, and is propagated toward circulator 7 by circulator 11. The outgoing wave on CH3, which has thus reached circulator 7, eventually propagates through circulator 7 toward antenna 6.

Transmission/reception integrated radio device 1 associated with channel CH4 is applied with an outgoing signal from coaxial line 5b. The outgoing signal is then supplied to transmitter 1a through BPF 1d. Transmitter 1a transmits an outgoing wave at transmission frequency ft4, based on the signal, through BPF 1c from waveguide 5a to branching filter 4.

The outgoing wave at transmission frequency ft4 on CH4 transmitted from transmission/reception integrated radio device 1 associated with channel CH4 propagates through transmission BPF 23 to circulator 11. The circulator 11 rotates in a direction such that the outgoing wave propagates from transmission BPF 23 to circulator 7. The outgoing wave on CH4, which has thus reached circulator 7, eventually propagates through circulator 7 toward antenna 6.

Next, a description will be given of the operation during reception. Incoming waves received by antenna 3 propagate to circulator 7 through waveguide 6. Since circulator 7 is connected to rotate in a direction such that the incoming waves propagate from waveguide 6 to circulator 12, the incoming waves from antenna 3 propagate toward circulator 12. Circulator 12 propagates the incoming waves to reception BPF 17. Since reception BPF 17 has characteristics of passing therethrough only an incoming wave on CH1 at reception frequency fr1 among the incoming waves from antenna 3, reception BPF 16 passes only the incoming wave on CH1 at reception frequency fr1, and reflects the remaining incoming waves.

The incoming wave on CH1 at reception frequency fr1, that has passed through reception BPF 17 of branching filter 4 and traveled through waveguide 5a, is received by receiver 1b through BPF 1e of transmission/reception integrated radio device 1 associated with channel CH1. Receiver 1b delivers the incoming wave at reception frequency fr1 to coaxial line 5b through BPF 1f based on the aforementioned signal.

The incoming waves reflected by reception BPF 17 are propagated from circulator 12 to circulator 13. Since circulator 13 is connected to rotate in a direction such that the incoming waves propagate from circulator 12 to reception BPF 20, the incoming waves reflected by reception BPF 17 propagate toward BPF 20. Reception BPF 20 passes therethrough only an incoming wave on CH2 at reception frequency fr2 among the incoming waves reflected by reception BPF 17, and reflects the remaining incoming waves.

The incoming wave on CH2 at reception frequency fr2, which has passed through reception BPF 20 of branching filter 4 and traveled through waveguide 5a, is received by receiver 1b through BPF 1e of transmission/reception integrated radio device 1 associated with channel CH2. Receiver 1b delivers the incoming wave at reception frequency fr2 to coaxial line 5b through BPF 1f based on the signal.

The received waves reflected by reception BPF 20 are propagated from circulator 13 to circulator 14. Since circulator 14 is connected to rotate in a direction such that the incoming waves propagate from circulator 13 to reception BPF 22, the incoming waves reflected by reception BPF 20 propagate toward reception BPF 22. Reception BPF 22 passes therethrough only an incoming wave on CH3 at reception frequency fr3 among the incoming waves reflected by reception BPF 20, and reflects the remaining incoming waves.

The incoming wave on CH3 at reception frequency fr3, which has passed through reception BPF 22 of branching filter 4 and traveled through waveguide 5a, is received by receiver 1b through BPF 1e of transmission/reception integrated radio device 1 associated with channel CH3. Receiver 1b delivers the incoming wave at reception frequency fr3 to coaxial line 5b through BPF 1f based on the signal.

The incoming waves reflected by reception BPF 22 are propagated from circulator 14 to circulator 15. Since circulator 15 is connected to terminator 25 and rotates in a direction such that the incoming waves propagate from circulator 14 to reception BPF 24, the incoming waves reflected by reception BPF 22 propagate toward reception BPF 24. Reception BPF 24 passes therethrough only an incoming wave on CH4 at reception frequency fr4 among the incoming waves reflected by reception BPF 22, and reflects the remaining incoming waves.

The incoming wave on CH4 at reception frequency fr4, which has passed through reception BPF 24 of branching filter 4 and traveled through waveguide 5a, is received by receiver 1b through BPF 1e of transmission/reception integrated radio device 1 associated with channel CH4. Receiver 1b delivers the incoming wave at reception frequency fr4 to coaxial line 5b through BPF 1f based on the signal.

As described above, according to the embodiment illustrated in FIG. 3, since each band pass filter set in branching filter 4 has one port on the radio device side, one port of transmission/reception integrated radio device 1 can be directly connected to the one port of each band pass filter set on a one-to-one correspondence, without the need for an additional branching filter interposed between the band pass filter set and transmission/reception integrated radio device. Further, since the number of ports of the branching filter can be increased on the radio device side by increasing the number of band pass filters contained therein, it is possible to readily increase the number of transmission/reception integrated radio devices connected to the single branching filter.

Accordingly, the branching filter based on the foregoing embodiment of the present invention is configured to support transmission/reception integrated radio devices, so that a multiplex transceiver can be readily built by combining the branching filter with transmission/reception integrated radio devices. Also, multiplexed signals, required for a microwave network and the like, can be readily generated by the thus built multiplex transceiver.

Figure 4:
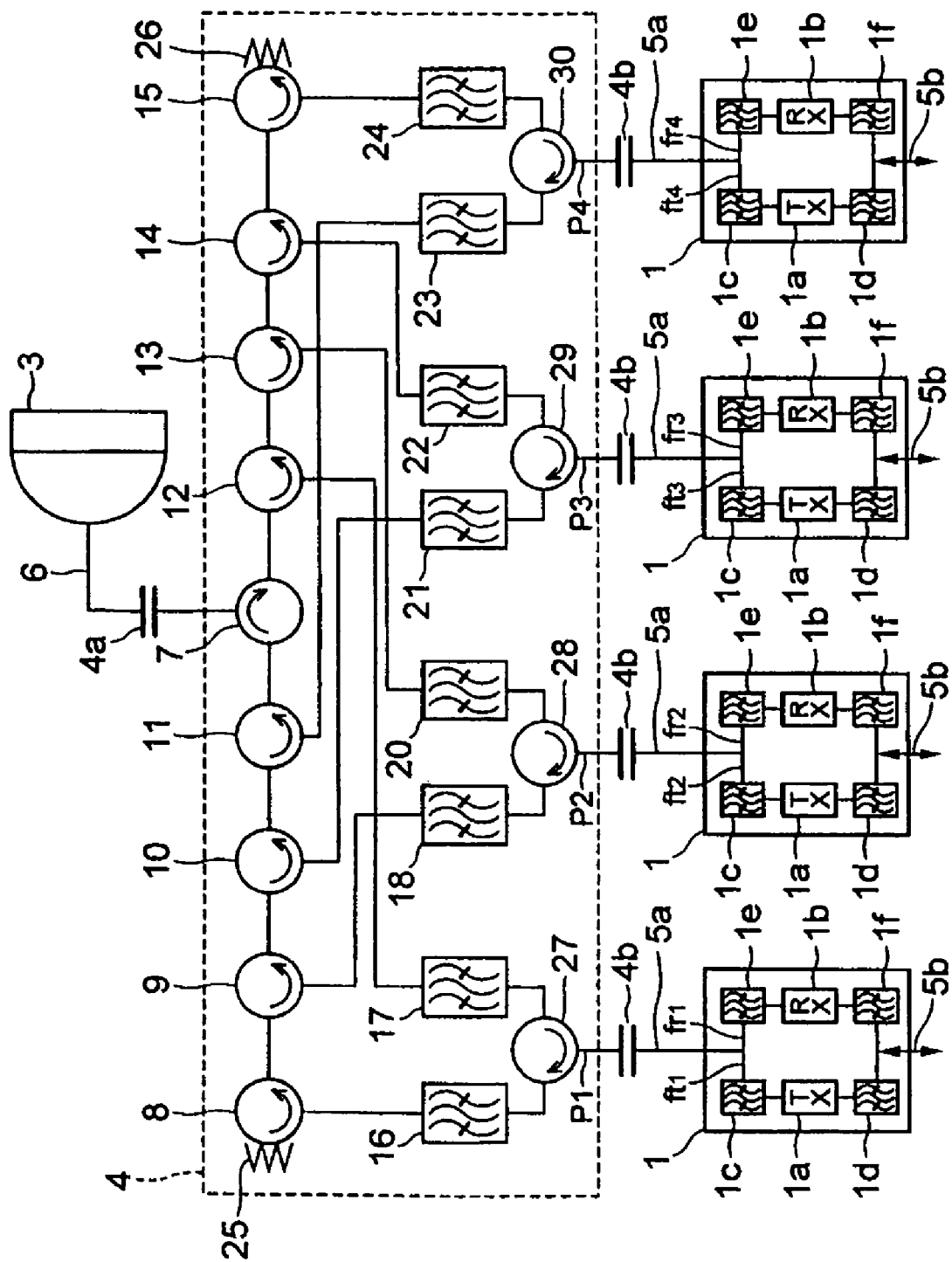
FIG. 4 is a circuit diagram illustrating another embodiment of the present invention.

An embodiment of the present invention illustrated in FIG. 4 is an exemplary modification to the embodiment illustrated in FIG. 3. In the embodiment illustrated in FIG. 3, waveguides 5a of transmission/reception integrated radio devices 1 are directly connected to each of ports P1, P2, P3, and P4, respectively, of a set of transmission BPF 18 and reception BPF 20; a set of transmission BPF 21 and reception BPF 22; and a set of transmission BPF 23 and reception BPF 24. The present invention, however, is not limited to this configuration. Like the embodiment illustrated in FIG. 4, a circulator may be disposed at one port of each set of BPF's, such that transmission/reception integrated radio devices 1 are connected to the inputs of those circulators. The configuration will be described in a specific manner.

In the embodiment illustrated in FIG. 4, branching filter 4 comprises transmission BPF 16 and reception BPF 17 which are combined into a set and have one port P1; transmission BPF 18 and reception BPF 20 which are combined into a set and have one port P2; transmission BPF 21 and reception BPF 22 which are combined into a set and have one port P3; and transmission BPF 23 and reception BPF 24 which are combined into a set and have one port P4. Circulators 27-30 are connected to ports P1, P2, P3, P4, respectively. Then, waveguides 5a of a plurality of transmission/reception integrated radio devices 1 associated with different channels are connected to each of the inputs of circulators 27-30, respectively.

Next, a description will be given of the operation during transmission. Transmission/reception integrated radio device 1 on channel CH1 combined with branching filter 4 configured as described above is applied with an outgoing signal from coaxial line 5b. The outgoing signal is then supplied to transmitter 1a through BPF 1d. Transmitter 1a transmits an outgoing wave at transmission frequency ft1, based on the signal, through BPF 1c from waveguide 5a to branching filter 4.

The outgoing wave at transmission frequency ft1 delivered from waveguide 5a is applied to circulator 27. Circulator 27 rotates in a direction such that an outgoing wave propagates from BPF 1c of transmission/reception integrated radio device 1 to transmission BPF 16 of dividing filter 4. Therefore, the outgoing wave having transmission frequency ft1 on CH1, transmitted from transmission/reception integrated radio device 1 associated with channel CH1 passes through transmission BPF 16 and propagates toward circulator 8. Circulator 8 rotates in a direction such that the outgoing wave propagates from transmission BPF 16 to circulator 9. Circulator 9 propagates the outgoing wave on CH1 toward transmission BPF 18. However, transmission frequency ft1 is within a rejection band of transmission BPF 18. Therefore, the outgoing wave on CH1 is reflected by transmission BPF 18, and is propagated toward circulator 10 by circulator 9. However, since transmission frequency ft1 is within a rejection band of each transmission BPF 21, 23, the outgoing wave is reflected by transmission BPF's 21, 23. The outgoing wave on CH1, which has thus reached circulator 7, eventually propagates through circulator 7 toward antenna 6.

Transmission/reception integrated radio device 1 associated with channel CH2 is applied with an outgoing signal from coaxial line 5b. The outgoing signal is then supplied to transmitter 1a through BPF 1d. Transmitter 1a transmits an outgoing wave at transmission frequency ft2, based on the signal, through BPF 1c from waveguide 5a to branching filter 4.

The outgoing wave at transmission frequency ft2 delivered from waveguide 5a is applied to circulator 28. Circulator 28 rotates in a direction such that an outgoing wave propagates from BPF 1c of transmission/reception integrated radio device 1 to transmission BPF 18 of branching filter 4. Therefore, the outgoing wave having transmission frequency ft2 on CH2 transmitted from transmission/reception integrated radio device 1 associated with channel CH2 propagates through transmission BPF 18 to circulator 9. The circulator 9 rotates in a direction such that the outgoing wave propagates from transmission BPF 18 to circulator 10. Circulator 10 propagates the outgoing wave on CH2 toward transmission BPF 21. However, transmission frequency ft2 is within a rejection band of transmission BPF 21. Therefore, the outgoing wave on CH2 is reflected by transmission BPF 21, and is propagated toward circulator 11 by circulator 10. However, since transmission frequency ft2 is within the rejection band of each transmission BPF 21, 23, the outgoing wave is reflected by transmission BPF's 21, 23. The outgoing wave on CH2, which has thus reached circulator 7, eventually propagates through circulator 7 toward antenna 6.

Transmission/reception integrated radio device 1 associated with channel CH3 is applied with an outgoing signal from coaxial line 5b. The outgoing signal is then supplied to transmitter 1a through BPF 1d. Transmitter 1a transmits an outgoing wave at transmission frequency ft3, based on the signal, through BPF 1c from waveguide 5a to branching filter 4.

The outgoing wave at transmission frequency ft3 delivered from waveguide 5a is applied to circulator 29. Circulator 29 rotates in a direction such that an outgoing wave propagates from BPF 1c of transmission/reception integrated radio device 1 to communications BPF 21 of branching filter 4. Therefore, the outgoing wave having transmission frequency ft3 on CH3 transmitted from transmission/reception integrated radio device 1 associated with channel CH3 propagates through transmission BPF 21 to circulator 10. Circulator 10 rotates in a direction such that the outgoing wave propagates from transmission BPF 21 to circulator 11. Circulator 11 propagates the outgoing wave on CH3 toward transmission BPF 23. However, transmission frequency ft3 is within the rejection band of transmission BPF 23. Therefore, the outgoing wave on CH3 is reflected by transmission BPF 23, and is propagated toward circulator 7 by circulator 11. The outgoing wave on CH3, which has thus reached circulator 7, eventually propagates through circulator 7 toward antenna 6.

Transmission/reception integrated radio device 1 associated with channel CH4 is applied with an outgoing signal from coaxial line 5b. The outgoing signal is then supplied to transmitter 1a through BPF 1d. Transmitter 1a transmits an outgoing wave at transmission frequency ft4, based on the signal, through BPF 1c from waveguide 5a to branching filter 4.

The outgoing wave at transmission frequency ft4 delivered from waveguide 5a is applied to circulator 30. Circulator 30 rotates in a direction such that an outgoing wave propagates from BPF 1c of transmission/reception integrated radio device 1 to communications BPF 24. Therefore, the outgoing wave at transmission frequency ft4 on CH4 transmitted from transmission/reception integrated radio device 1 associated with channel CH4 propagates through transmission BPF 23 to circulator 11. The circulator 11 rotates in a direction such that the outgoing wave propagates from transmission BPF 23 to circulator 7. The outgoing wave on CH4, which has thus reached circulator 7, eventually propagates through circulator 7 toward antenna 6.

Next, a description will be given of the operation during reception. Incoming waves received by antenna 3 propagate to circulator 7 through waveguide 6. Since circulator 7 rotates in a direction such that the incoming waves propagate from waveguide 6 to circulator 12, the incoming waves from antenna 3 propagate toward circulator 12. Circulator 12 propagates the incoming waves to reception BPF 17. Reception BPF 17 has characteristics of passing therethrough only an incoming wave on CH1 at reception frequency fr1 among the incoming waves received by antenna 3, reception BPF 17 passes therethrough only the incoming wave on CH1 at reception frequency fr1, and reflects the remaining incoming waves.

The incoming wave on CH1 at reception frequency fr1 which has passed through reception BPF 17 of branching filter 4 is supplied to circulator 27. Circulator 27 rotates in a direction such that the incoming wave propagates from BPF 17 of branching filter 4 to BPF 1e of transmission/reception integrated radio device 1. Therefore, the incoming wave at reception frequency fr1 on CH1, which has passed through reception BPF 17 of branching filter 4 and traveled through waveguide 5a, is received by receiver 1b through BPF 1e of transmission/reception integrated radio device 1 associated with channel CH1. Receiver 1b delivers the incoming wave at reception frequency fr1 to coaxial line 5b through BPF 1f based on the aforementioned signal.

The incoming waves reflected by reception BPF 17 are propagated from circulator 12 to circulator 13. Since circulator 13 rotates in a direction such that the incoming waves propagate from circulator 12 to reception BPF 20, the incoming waves reflected by reception BPF 17 propagate toward BPF 20. Reception BPF 20 passes therethrough only an incoming wave on CH2 at reception frequency fr2 from among the incoming waves reflected by reception BPF 17, and reflects the remaining incoming waves.

The incoming wave on CH2 at reception frequency fr2, which has passed through reception BPF 20, is supplied to circulator 28. Circulator 28 rotates in a direction such that the incoming wave propagates from BPF 20 of branching filter 4 to BPF 1e of transmission/reception integrated radio device 1. Therefore, the incoming wave at reception frequency fr2 on CH2, which has passed through reception BPF 17 of branching filter 4 and traveled through waveguide 5a, is received by receiver 1b through BPF 1e of transmission/reception integrated radio device 1 associated with channel CH2. Receiver 1b delivers the incoming wave at reception frequency fr2 to coaxial line 5b through BPF 1f based on the signal.

The incoming waves reflected by reception BPF 20 are propagated from circulator 13 to circulator 14. Since circulator 14 rotates in a direction such that the incoming waves propagate from circulator 13 to reception BPF 22, the incoming waves reflected by reception BPF 20 propagate toward reception BPF 22. Reception BPF 22 passes therethrough only an incoming wave on CH3 at reception frequency fr3 from among the incoming waves reflected by reception BPF 20, and reflects the remaining incoming waves.

The incoming wave on CH3 at reception frequency fr3, which has passed through reception BPF 22 of branching filter 4, is supplied to circulator 29. Circulator 29 rotates in a direction such that the incoming wave propagates from BPF 22 of branching filter 4 to BPF 1e of transmission/reception integrated radio device 1. Therefore, the incoming wave at reception frequency fr3 on CH3, which has passed through reception BPF 22 of branching filter 4 and traveled through waveguide 5a, is received by receiver 1b through BPF 1e of transmission/reception integrated radio device 1 associated with channel CH3. Receiver 1b delivers the incoming wave at reception frequency fr3 to coaxial line 5b through BPF 1f based on the signal.

The incoming waves reflected by reception BPF 22 are propagated from circulator 14 to circulator 15. Since circulator 15 is connected to terminator 25 and rotates in a direction such that the incoming waves propagate from circulator 14 to reception BPF 24, the incoming waves reflected by reception BPF 22 propagate toward reception BPF 24. Reception BPF 24 passes therethrough only an incoming wave on CH4 at reception frequency fr4 from among the incoming waves reflected by reception BPF 22, and reflects the remaining incoming waves.

The incoming wave on CH4 at reception frequency fr4, which has passed through reception BPF 24, is supplied to circulator 30. Circulator 30 rotates in a direction such that the incoming wave propagates from BPF 24 of branching filter 4 to BPF 1e of transmission/reception integrated radio device 1. Therefore, the incoming wave at reception frequency fr4 on CH4, which has passed through reception BPF 24 of branching filter 4 and traveled through waveguide 5a, is received by receiver 1b through BPF 1e of transmission/reception integrated radio device 1 associated with channel CH4. Receiver 1b delivers the incoming wave at reception frequency fr4 to coaxial line 5b through BPF 1f based on the signal.

As described above, according to the embodiment illustrated in FIG. 4, by disposing a circulator between a set of transmission BPF and reception BPF and transmission/reception integrated radio device 1, they can be connected without taking into consideration the out-of-band reflection characteristics of the respective transmission BPF and reception BPF. A specific description will be given below in this respect.

In the configuration which does not have circulators intervening between transmission/reception integrated radio devices 1 and sets of transmission BPF and reception BPF, the pass band must be matched with the reflection band in phase to prevent them from affecting each other.

On the other hand, the circulator disposed as illustrated in FIG. 4 advantageously eliminates the need for previously adjusting the out-of-band reflection characteristics of the transmission BPF and reception BPF, when they are exchanged for changing the frequency, thus facilitating a change in radio frequency.

While the foregoing description has been given of a four-channel configuration composed of branching filter 4 and transmission/reception integrated radio devices 1, the present invention is not so limited. Also, while waveguides are used to connect branching filter 4 to antenna 3, and branching filter 4 to transmission/reception integrated radio devices 1, coaxial lines may be used instead of the waveguides for the connections. Alternatively, a mixture of waveguides and coaxial lines may be used for the connections.

Also, while transmission/reception integrated radio devices 1 have been provided for two channels each of the transmission system and the reception system in the foregoing description, the present invention is not limited to this number of channels. Likewise, while branching filter 4 has four sets of transmission BPF and reception BPF for four channels, the present invention is not so limited.

While preferred embodiments of the present invention have been described using specific terms, such description is for illustrative purposes only, and it is to be understood that changes and variations may be made without departing from the spirit or scope of the following claims.

What is claimed is:

1. A branching filter comprising:
   a plurality of band pass filter units, each band pass filter unit having two ports on an antenna side and one port on a radio device side for separating an outgoing wave from an incoming wave; and
   an antenna duplexer connected to the plurality of band pass filter units for transmitting the outgoing wave from said band pass filter units to said antenna and transmitting the incoming wave from said antenna to said band pass filter units,
   wherein said one port on the radio device side of each said band pass filter unit sends and receives signals to and from a radio device;
   wherein each said band pass filter unit includes a transmission filter for passing therethrough only a particular transmission frequency band, and a reception filter for passing therethrough only a particular reception frequency band;
   wherein said transmission filter and said reception filter have one terminal connected in common to form said one port on the radio device side;
   wherein the transmission filter of each of said plurality of band pass filters is connected to one port of the antenna duplexer, and
   wherein the reception filter of each of said plurality of band pass filters is connected to a second port of the antenna duplexer.

2. The branching filter according to claim 1, comprising a plurality of said band pass filter units, and a plurality of ports on the radio device side, said ports including said one port for each of said plurality of band pass filter units.

3. The branching filter according to claim 2, wherein said plurality of band pass filters each separate an outgoing wave and an incoming wave in a particular band on a channel-by-channel basis.

4. The branching filter according to claim 2, further comprising a plurality of circulators each connected to said one of said ports of said plurality of band pass filter units on the antenna side.

5. A multiplex transceiver comprising:
   a branching filter including a plurality of band pass filter units, each band pass filter unit having two ports on an antenna side and a single port on a radio device side for separating an outgoing wave from an incoming wave, and an antenna duplexer connected to the plurality of band pass filter units for transmitting the outgoing wave from said band pass filter units to said antenna and transmitting the incoming wave from said antenna to said band pass filter units; and
   a transmission/reception integrated radio device having a common port connected to the single port on the radio device side of each said band pass filter unit;
   wherein said transmission/reception integrated radio device performs transmission and reception from said common port through said single port on the radio device side of each said band pass filter unit;
   wherein each said band pass filter unit includes a transmission filter for passing therethrough only a particular transmission frequency band, and a reception filter for passing therethrough only a particular reception frequency band;
   wherein the transmission filter of each of said plurality of band pass filters is connected to one port of the antenna duplexer; and
   wherein the reception filter of each of said plurality of band pass filters is connected to a second port of the antenna duplexer.

6. The multiplex transceiver according to claim 5, wherein:
   each said branching filter unit comprises a plurality of said band pass filter units, and a plurality of ports on the radio device side, said ports including said one port for each of said plurality of band pass filter units, and
   said multiplex transceiver comprises a plurality of said transmission/reception integrated radio devices each connected to each of the ports on the radio device side.

7. The multiplex transceiver according to claim 6, wherein said branching filter comprises an antenna port connected to a single antenna.

8. The branching filter according to claim 1, wherein said antenna duplexer comprises a plurality of circulators and a transmission/reception duplexer.

9. The branching filter according to claim 8, wherein said each of said plurality of circulators is connected to one of said plurality of bandpass filter units.

10. The branching filter according to claim 8, wherein said each of said plurality of circulators connected to one of said plurality of bandpass filter units which pass particular transmission frequency bands are connected in series to said transmission/reception duplexer.

11. The branching filter according to claim 8, wherein said each of said plurality of circulators connected to one of said plurality of bandpass filter units which pass particular reception frequency bands are connected in series to said transmission/reception duplexer.

12. The multiplex transceiver according to claim 5, wherein said antenna duplexer comprises a plurality of circulators and a transmission/reception duplexer.

13. The multiplex transceiver according to claim 12, wherein said each of said plurality of circulators is connected to one of said plurality of bandpass filter units.

14. The multiplex transceiver according to claim 12, wherein said each of said plurality of circulators connected to one of said plurality of bandpass filter units which pass particular transmission frequency bands are connected in series to said transmission/reception duplexer.

15. The multiplex transceiver according to claim 12, wherein said each of said plurality of circulators connected to one of said plurality of bandpass filter units which pass particular reception frequency bands are connected in series to said transmission/reception duplexer.

16. The branching filter according to claim 1, wherein the transmission filter of each of said plurality of band pass filters is connected to the antenna duplexer such that signals from the transmission filter of each of said plurality of band pass filters propagate to the antenna, and wherein the reception filter of each of said plurality of band pass filters is connected to the antenna duplexer such that signals from the antenna propagate to the reception filter of each of said plurality of band pass filters.

17. The branching filter according to claim 1, further comprising at least one first circulator connected between the transmission filter of each of said plurality of band pass filters and the antenna duplexer, and at least one second circulator connected between the antenna duplexer and the reception filter of each of said plurality of band pass filters.

18. The multiplex transceiver according to claim 5, wherein the transmission filter of each of said plurality of band pass filters is connected to the antenna duplexer such that signals from the transmission filter of each of said plurality of band pass filters propagate to the antenna, and wherein the reception filter of each of said plurality of band pass filters is connected to the antenna duplexer such that signals from the antenna propagate to the reception filter of each of said plurality of band pass filters.

19. The multiplex transceiver according to claim 5, further comprising at least one first circulator connected between the transmission filter of each of said plurality of band pass filters and the antenna duplexer, and at least one second circulator connected between the antenna duplexer and the reception filter of each of said plurality of band pass filters.

* * * * *